(12) United States Patent
Choi et al.

(10) Patent No.: US 12,085,300 B2
(45) Date of Patent: Sep. 10, 2024

(54) AIR PURIFYING APPARATUS AND METHOD FOR CONTROLLING SAME

(71) Applicant: COWAY CO., LTD., Gongju-si (KR)

(72) Inventors: Shin Il Choi, Seoul (KR); Young Mi Lee, Seoul (KR)

(73) Assignee: COWAY CO., LTD., Gongju-si (KR)

( * ) Notice: Subject to any disclaimer, the term of this patent is extended or adjusted under 35 U.S.C. 154(b) by 940 days.

(21) Appl. No.: 17/252,090

(22) PCT Filed: Jun. 13, 2019

(86) PCT No.: PCT/KR2019/007158
§ 371 (c)(1),
(2) Date: Dec. 14, 2020

(87) PCT Pub. No.: WO2019/240514
PCT Pub. Date: Dec. 19, 2019

(65) Prior Publication Data
US 2021/0254853 A1   Aug. 19, 2021

(30) Foreign Application Priority Data

Jun. 14, 2018   (KR) .................. 10-2018-0068294
Jun. 7, 2019    (KR) .................. 10-2019-0067291

(51) Int. Cl.
*F24F 11/77*   (2018.01)
*F24F 3/16*    (2021.01)
(Continued)

(52) U.S. Cl.
CPC ............... *F24F 11/77* (2018.01); *F24F 3/16* (2013.01); *F24F 8/10* (2021.01); *F24F 11/64* (2018.01); *F24F 2110/64* (2018.01)

(58) Field of Classification Search
CPC ..................................................... F24F 11/77
See application file for complete search history.

(56) References Cited

U.S. PATENT DOCUMENTS 9,140,824 B1   9/2015   Mewes et al.
9,311,605 B1   4/2016   Mewes et al.
(Continued)

FOREIGN PATENT DOCUMENTS

CN    1576734 A    2/2005
JP    4-358511 A   12/1992
(Continued)

OTHER PUBLICATIONS

Combined Chinese Office Action and Search Report issued Aug. 3, 2021 in corresponding Chinese Patent Application No. 201980040079.1 (with English Translation of Category of Cited Documents), 13 pages.
(Continued)

*Primary Examiner* — Nathan L Laughlin
(74) *Attorney, Agent, or Firm* — Oblon, McClelland, Maier & Neustadt, L.L.P.

(57) ABSTRACT

Disclosed are an air purifying apparatus and a method for controlling the same. Specifically, disclosed are an air purifying apparatus and a method for controlling the same, in which the air purifying apparatus includes: a fan 100 for discharging air; a sensor 200; and a controller 300 that controls a rotation of the fan 100, in which the controller 300 includes: a variation calculation module 310 for calculating a rotation speed of the fan 100, a variation in the rotation speed of the fan 100, and a variation in a concentration of particles measured by the sensor 200, for a preset time interval from a reference time; a standard score calculation module 320 for calculating, by using a preset first method, the calculated rotation speed of the fan 100, the calculated variation in the rotation speed of the fan 100, and the calculated variation in the concentration of particles for the preset time interval from the reference time respectively as standard score values for the preset time interval from the
(Continued)

reference time, summing up the standard score values, and repeating the calculating and summing to calculate a plurality of summed standard score values; a learning module 330 for storing, as optimum values of the reference time, the rotation speed of the fan 100, the variation in the rotation speed of the fan 100, and the variation in the concentration of particles, which correspond to a highest value among the plurality of summed standard score values; and an artificial intelligence control module 340 for controlling, at every reference time, the rotation speed of the fan 100 in accordance with the rotation speed of the fan 100 corresponding to the optimum values stored in the learning module 330.

15 Claims, 8 Drawing Sheets

(51) Int. Cl.
  *F24F 8/10* (2021.01)
  *F24F 11/64* (2018.01)
  *F24F 110/64* (2018.01)

(56) References Cited

U.S. PATENT DOCUMENTS

| | | | |
|---|---|---|---|
| 9,336,492 | B1 | 5/2016 | Mewes et al. |
| 9,518,753 | B2 | 12/2016 | Mewes et al. |
| 9,817,375 | B2 | 11/2017 | Li et al. |
| 10,255,390 | B2 | 4/2019 | Mewes et al. |
| 10,255,391 | B2 | 4/2019 | Mewes et al. |
| 2015/0248118 | A1 | 9/2015 | Li et al. |
| 2016/0215994 | A1 | 7/2016 | Mewes et al. |
| 2017/0061050 | A1 | 3/2017 | Mewes et al. |
| 2018/0299150 | A1* | 10/2018 | Ajax .................... F24F 11/0008 |
| 2020/0256346 | A1* | 8/2020 | Wu ........................ F04D 29/703 |
| 2021/0356158 | A1* | 11/2021 | Kwon ...................... G06N 3/04 |

FOREIGN PATENT DOCUMENTS

| | | |
|---|---|---|
| JP | 11-14119 A | 1/1999 |
| JP | 2000-145399 A | 5/2000 |
| JP | 2007-24493 A | 2/2007 |
| JP | 2009-228992 A | 10/2009 |
| KR | 10-1091114 B1 | 12/2011 |
| KR | 10-2013-0010649 A | 1/2013 |
| KR | 10-2017-0105948 A | 9/2017 |
| WO | WO 2018/061147 A1 | 4/2018 |

OTHER PUBLICATIONS

Japanese Office Action issued Mar. 1, 2022 in Japanese Patent Application No. 2020-569117, 6 pages.
International Search Report issued on Sep. 26, 2019 in PCT/KR2019/007158 filed on Jun. 13, 2019, 2 pages.

* cited by examiner

AIR PURIFYING APPARATUS AND METHOD FOR CONTROLLING SAME

TECHNICAL FIELD

The present invention relates to an air purifying apparatus and a method for controlling the same, and more specifically to an air purifying apparatus capable of not only controlling a rotation speed of a fan according to a concentration of particles measured in real time and a variation thereof, but also controlling the rotation speed of the fan according to time based on a user's life pattern, and a method for controlling the same.

BACKGROUND ART

The growing fine dust problem has led into increased interest in the quality of indoor air. Conventionally, ventilation is performed by opening windows to let the outside air to flow in so as to increase the quality of indoor air, but it is difficult to expect the satisfactory air purifying effect of the indoor air with this way of ventilation alone if the outside air contains an increased concentration of particles therein.

Accordingly, air cleaners are in the spotlight as a way to improve quality of indoor air without ventilation through the windows. The air cleaner includes a HEPA filter, a dust filter, and the like provided therein to perform the indoor air purifying function including filtering the indoor air drawn into the cleaner and then discharging the air back.

Furthermore, technologies for purifying indoor air have been disclosed, which automatically operate the air cleaner according to the concentration of fine dust measured by a fine dust sensor provided in the air cleaner, without requiring the user to directly operate the air cleaner.

Korean Patent Laid-open No. 10-2017-0105948 discloses an air purifying fan system that determines whether or not to operate the air cleaner by using real-time information on fine dust measured using a fine dust measuring sensor.

Meanwhile, since this type of air purifying fan system operates the air cleaner to purify the indoor air once there is a high concentration of fine dust, there is a limitation that it is difficult to predict the occurrence of fine dust before the occurrence of fine dust and preemptively perform air purification to remove the fine dust in advance.

Korean Patent No. 10-1091114 discloses a ventilation system for purifying indoor polluted air with fresh air by controlling the opening and closing of a supply port and an exhaust port according to a degree of pollution of indoor air.

However, while this type of ventilation system is meaningful as a method for purifying indoor polluted air by using outside air, this is limited as there is no consideration of additional pollution of indoor air by fine dust contained in the outside air.

Further, this type of ventilation system has a limitation in that there is no consideration of various particles that can enter indoor other than fine dust and a system and a control method that can be applied to various air purifying apparatuses.

CITATION LIST

Patent Literature (Patent Literature 1) Korean Patent Laid-open No. 10-2017-0105948 (Sep. 20, 2017)
(Patent Literature 2) Korean Patent No. 10-1091114 (Dec. 13, 2011)

DISCLOSURE

Technical Problem

An object of the present invention to provide an air purifying apparatus and a method for controlling the same, which are capable of improving the efficiency of indoor air purification and also of reducing power consumption by learning a user's life pattern so as to control a rotation speed of a fan of the air purifying apparatus according to the condition of the particles at a reference time such that the rotation speed of the fan at the reference time is appropriately selected to lower the particles upon elapse of a predetermined time, and further, when the concentration of indoor particles increases rapidly, the rotation speed of the fan is increased in real time.

Technical Solution

In order to achieve the object above, the present invention provides an air purifying apparatus including: a fan 100 for discharging air; a sensor 200; and a controller 300 that controls a rotation of the fan 100, in which the controller 300 includes: a variation calculation module 310 for calculating a rotation speed of the fan 100, a variation in the rotation speed of the fan 100, and a variation in a concentration of particles measured by the sensor 200, for a preset time interval from a reference time; a standard score calculation module 320 for calculating, by using a preset first method, the calculated rotation speed of the fan 100, the calculated variation in the rotation speed of the fan 100, and the calculated variation in the concentration of particles for the preset time interval from the reference time respectively as standard score values for the preset time interval from the reference time, summing up the standard score values, and repeating the calculating and summing to calculate a plurality of summed standard score values; a learning module 330 for storing, as optimum values of the reference time, the rotation speed of the fan 100, the variation in the rotation speed of the fan 100, and the variation in the concentration of particles, which correspond to a highest value among the plurality of summed standard score values; and an artificial intelligence control module 340 for controlling, at every reference time, the rotation speed of the fan 100 in accordance with the rotation speed of the fan 100 corresponding to the optimum values stored in the learning module 330.

In addition, there may be provided a pollution index calculation module 350 for calculating the concentration of particles measured by the sensor 200 as a pollution index by using a preset second method.

In addition, there may be provided an automatic control module 360 for dividing the calculated pollution index into predetermined levels according to the order relation thereof and controlling the rotation speed of the fan 100 to correspond to the predetermined levels.

In addition, the present invention provides a method for controlling an air purifying apparatus including a fan 100 for discharging air and a sensor 200, including steps of: (a) calculating, by a variation calculation module 310, a rotation speed of the fan 100, a variation in the rotation speed of the fan 100, and a variation in a concentration of particles measured by the sensor 200, for a preset time interval from a reference time; (b) by using a preset first method, calculating, by a standard score calculation module 320, the calculated rotation speed of the fan 100, the calculated variation in the rotation speed of the fan 100, and the calculated variation in the concentration of particles for the preset time interval from the reference time respectively as standard score values for the preset time interval from the reference time, summing up the standard score values, and repeating the calculating and summing to calculate a plurality of summed standard score values; (c) storing, by a learning module 330, the rotation speed of the fan 100, the variation in the rotation speed of the fan 100, and the variation in the concentration of particles, which correspond to a highest value among the plurality of summed standard score values, as optimum values of the reference time; and (d) controlling at every reference time, by an artificial intelligence control module 340, the rotation speed of the fan 100 in accordance with the rotation speed of the fan 100 corresponding to the optimum values stored in the learning module 330.

In addition, the air purifying apparatus may be operable in a data collection mode, wherein the data collection mode may be to repeat Steps (a) to (c).

In addition, the data collection mode and Step (d) may be simultaneously operable.

In addition, the air purifying apparatus may be operable in an artificial intelligence mode, wherein the artificial intelligence mode may be to repeat Steps (a) to (d).

In addition, the method may further include Step (e) for calculating, by a pollution index calculation module 350, the concentration of particles measured by the sensor 200 as a pollution index by using a preset second method.

In addition, after Step (e), the method may further include Step (f) for dividing, by an automatic control module 360, the calculated pollution index into predetermined levels according to the order relation thereof, and controlling the rotation speed of the fan 100 to correspond to the predetermined levels.

In addition, the air purifying apparatus may be operable in an automatic mode, wherein the automatic mode may be to repeat Steps (e) and (f).

In addition, while the air purifying apparatus is operated in the artificial intelligence mode, when the pollution index obtained by calculating the concentration of particles measured by the sensor 200 by using the preset second method corresponds to a preset level among the predetermined levels divided by the automatic control module 360, the air purifying apparatus may be forcibly operated in the automatic mode.

In addition, when an actual time corresponds to the reference time while the air purifying apparatus is operated in the automatic mode, and when the pollution index obtained by calculating the concentration of particles measured by the sensor 200 by using the preset second method corresponds to a preset level among the predetermined levels divided by the automatic control module 360, the air purifying apparatus may be operated in the automatic mode.

In addition, when the actual time corresponds to the reference time while the air purifying apparatus is operated in the automatic mode, and when the pollution index obtained by calculating the concentration of the particles measured by the sensor 200 by using the preset second method does not correspond to a preset level among the predetermined levels divided by the automatic control module 360, the air purifying apparatus may be operated in the artificial intelligence mode.

In addition, when the actual time corresponds to the reference time while the air purifying apparatus is operated in the artificial intelligence mode, and when the pollution index obtained by calculating the concentration of particles measured by the sensor 200 by using the preset second method corresponds to a preset level among the predetermined levels divided by the automatic control module 360, the air purifying apparatus may be operated in the automatic mode.

In addition, when the actual time corresponds to the reference time while the air purifying apparatus is operated in the artificial intelligence mode, and when the pollution index obtained by calculating the concentration of particles measured by the sensor 200 by using the preset second method does not correspond to a preset level among the predetermined levels divided by the automatic control module 360, the air purifying apparatus may be operated in the artificial intelligence mode.

Advantageous Effects

According to the present invention, the air purifying apparatus repeatedly learns the amount of fine dust generated at each time and places in use according to the user's life pattern to forecast the concentration of particles generated according to the user's life pattern and perform air purification preemptively, and as a result, the air purifying apparatus is capable of purifying indoor air before mass generation of particles.

In addition, while controlling the air purifying apparatus according to the user's life pattern, when the concentration of particles suddenly increases due to an unforeseen variable, the indoor air can be purified by increasing the rotation speed of the fan regardless of the user's life pattern previously stored, and as a result, it is possible to immediately cope with unexpected changes in the concentration of particles.

Accordingly, while controlling the rotation speed of the fan according to the concentration of particles generated according to the user's life pattern, when the concentration of particles increases rapidly, the rotation speed of the fan can be increased, and as a result, it is possible to maintain a clean state of indoor air while minimizing power consumption.

In addition, the sensor and the controller according to the present invention may be provided in a variety of devices for purifying air to control the devices for purifying air.

In addition, according to the present invention, it is possible to perform the control based on the concentration of various particles such as fine dust, harmful substances, carbon dioxide, oxygen, etc., which are present in inside, so that the concentrations of various particles can be adjusted in accordance with the needs of the user.

MODE FOR INVENTION

Figure 1:
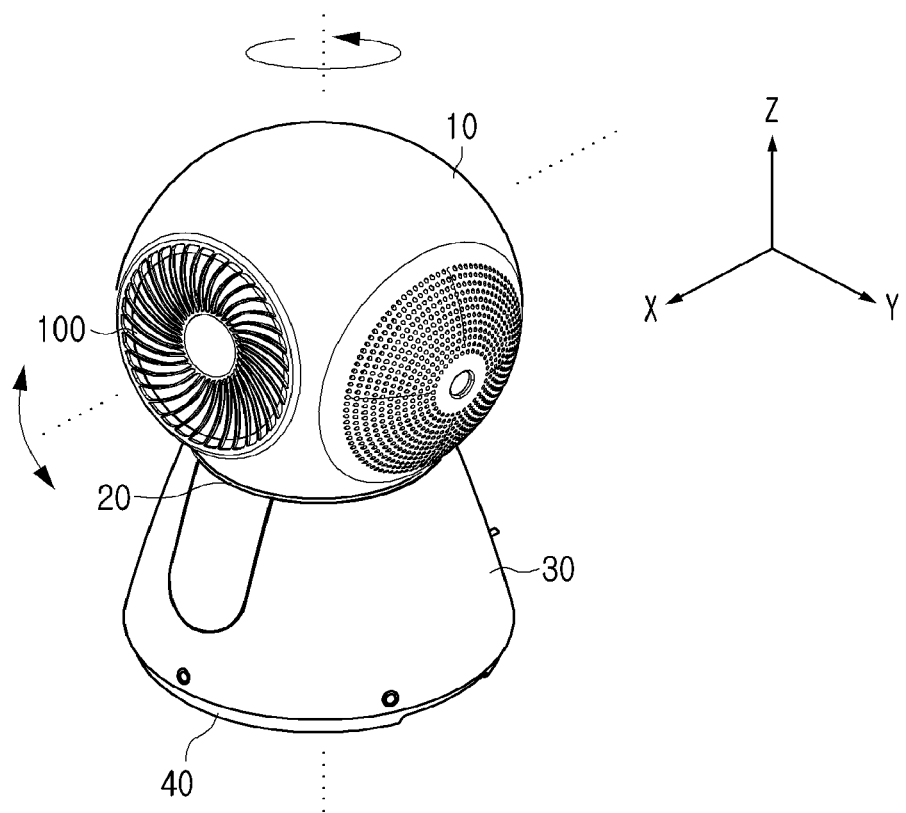
FIG. 1 is a perspective view showing the air purifying apparatus according to an embodiment of the present invention.

Hereinafter, the air purifying apparatus and the method for controlling the air purifying apparatus according to an embodiment of the present invention will be described in detail with reference to the accompanying drawings.

The terms "front side", "rear side", "left side", "right side", "top side", and "bottom side" used in the following description will be understood with reference to the coordinate system shown in FIG. 1.

In the following description, the air purifying apparatus may mean both the device that purifies particles in the air and the device that manages particles in the air.

In the following description, the particles include all pollutants that may present indoors or outdoors, such as fine dust, dust, indoor volatile organic compounds, oxygen, carbon dioxide, etc.

In the following description, as an example of the air purifying apparatus according to the present invention, although an air cleaner is described with reference to the configuration of the air cleaner, it is to be noted that any device that purifies and manages air for particles may use the configuration and control method according to the present invention. For example, in the case of an air conditioner or a kitchen hood, the sensor or the controller according to the present invention may be provided to control and purify the concentration of particles such as fine dust.

In the following description, the present invention is described as purifying air based on the concentration of "fine dust", but is not limited thereto. In addition, the air may be purified based on the concentration of particles such as fine dust, dust, indoor volatile organic compounds, oxygen, and carbon dioxide.

In the following table, the method for controlling the air purifying apparatus according to the present invention based on the concentration of "fine dust" will be described, but this is merely an example, and the air purifying apparatus may be controlled by applying the concentration of particles such as fine dust, dust, indoor volatile organic compounds, oxygen, carbon dioxide, etc.

The term "reference time" used in the following description refers to a specific time at which the air purifying apparatus according to an embodiment of the present invention measures a rotation speed of a fan 100 to be described below and a concentration of fine dust. The reference time can be selected as any time in 24 hours of a day.

The term "preset time interval" used in the following description refers to a specific time elapsed from the reference time. In an embodiment, the preset time interval may be set to 5 minutes, but the value of the time interval may be changed.

The reference time and the preset time interval may be repeated in succession. In other words, a specific time point of a day may be set to be a reference time, and a point in time at which a preset time interval elapses may be set to be another reference time.

For example, when the reference time is "7 a.m." and the preset time interval is "5 minutes", "7:05 a.m.", which is 5 minutes elapsed from 7 a.m. may be set to be a new reference time.

Accordingly, the air purifying apparatus according to an embodiment of the present invention may continuously learn a user's life pattern for all 24 hours a day.

The term "preset first method" used in the following description refers to a method for calculating the standard score values based on the rotation speed of the fan 100, the concentration of fine dust and the variations of each, for the preset time interval from the reference time, which will be described below in detail.

The term "preset second method" used in the following description refers to a method of the pollution index calculation module 350 to be described below for calculating a pollution index to classify the measured concentration of fine dust into several levels, which will be described below in detail.

The term "predetermined level" used in the following description refers to a plurality of levels dividing the pollution index calculated by the preset second method in the order relation, and in an embodiment, the predetermined level may consist of three.

The term "preset level" used in the following description refers to a level of the largest pollution index among the predetermined levels classifying the pollution index.

1. Description of Configuration of Air Purifying Apparatus

Figure 2:
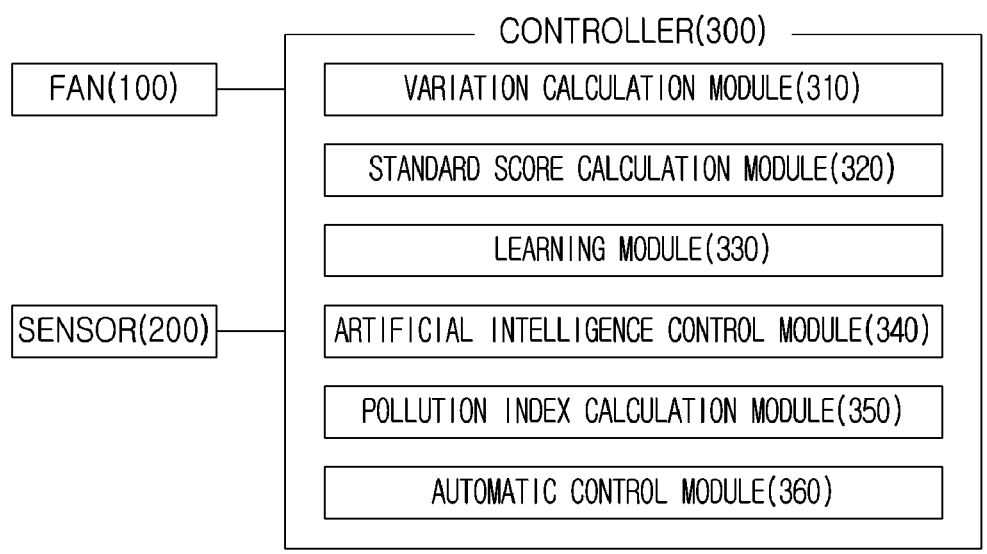
FIG. 2 is a block diagram showing a configuration for controlling the air purifying apparatus of FIG. 1.
Figure 3:
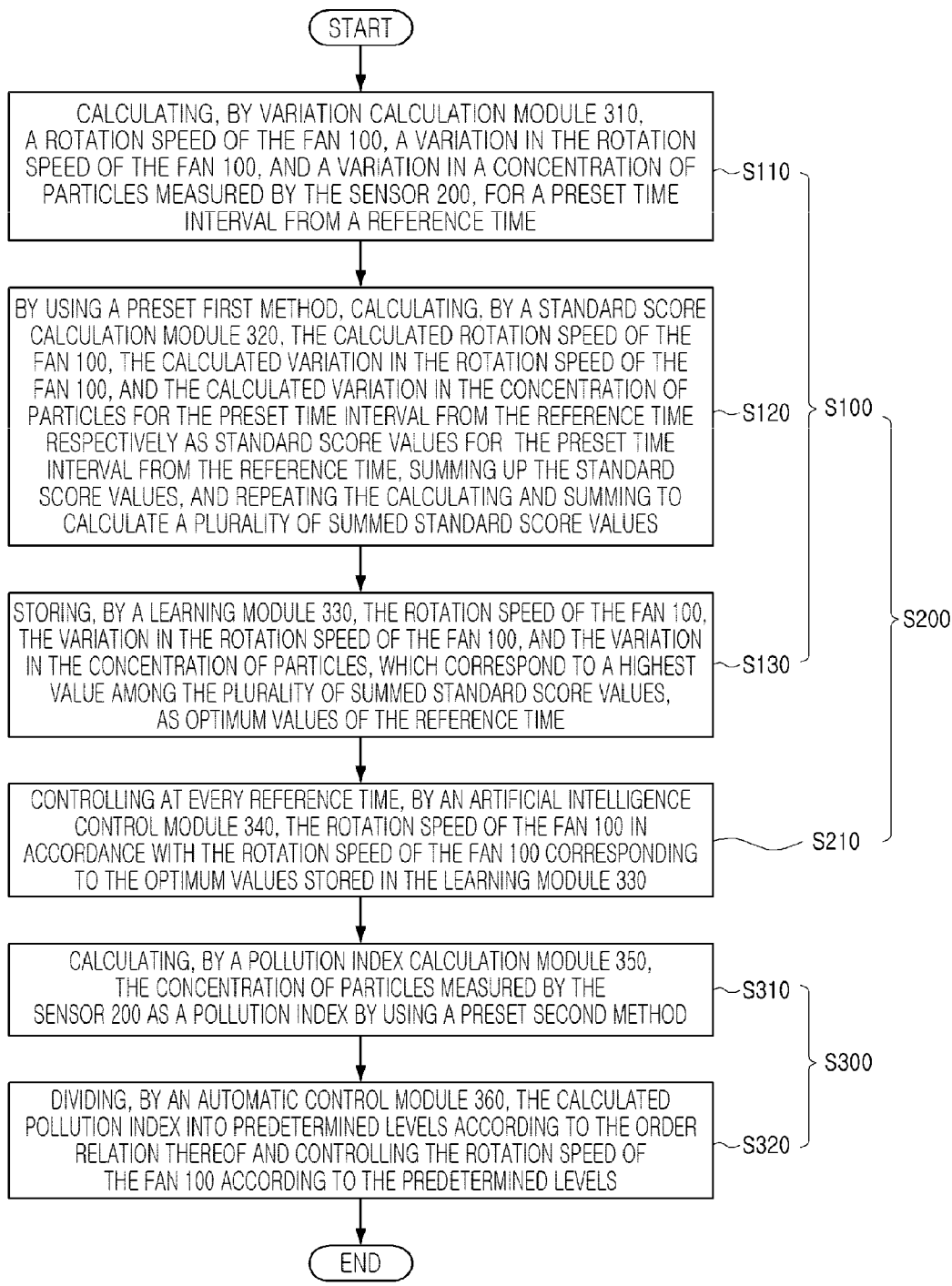
FIG. 3 is a flowchart showing the method for controlling the air purifying apparatus according to an embodiment of the present invention.

Referring to FIGS. 1 and 2, an air cleaner as an embodiment of the air purifying apparatus according to the present invention includes a head 10, a neck 20, a body 30, a base 40, and a sensor 200.

The air cleaner according to the embodiment as shown has such a shape that the head 10 in spherical shape is coupled to the body 30 through the neck 20, although the air cleaner may be provided integrally and provided in various forms, such as a form in which an air inlet and an outlet are formed on the upper side, and so on.

In addition, while the example of the air cleaner is described, the air purifying apparatus according to the present invention does not necessarily include the head 10, the neck 20, the body 30, and the base 40, and the components that form the exterior may be varied according to the type of air purifying apparatus.

(1) Description of Head 10

The head 10 performs the air purifying function and is rotatable both horizontally and vertically. This may allow a user to discharge air in various directions. The horizontal and vertical rotations may be performed simultaneously or individually.

In an embodiment, when the head 10 is rotated vertically, the head 10 is rotated up and down, while the neck 20 and the body 30 remain fixed. When the head 10 is rotated horizontally, the head 10 and the neck 20 are rotated left and right, and the body 30 remains fixed.

The head 10 includes an upper housing (not shown) of the head, a fan assembly (not shown), and a lower housing (not shown) of the head, and performs the air purifying function of intaking outside air, purifying it with a filter (not shown), and then discharging the air back.

To this end, the fan assembly (not shown) includes intake grills (not shown) positioned on the left and right sides, a filter (not shown) positioned inside the intake grills (not shown), an intake fan (not shown), a fan 100 positioned in front of the intake fan (not shown), and a fan grill (not shown).

As shown, in order to intake air individually or simultaneously from the left and right sides, the intake fan (not shown) may be a double-sided fan, but a modification is possible in which air intake is performed only through either the left or right side, and in this case, the intake fan (not shown) may be a single-sided fan.

Filters (not shown) such as pre-filters, HEPA filters, etc. may be included, although the filters included are not limited to any particular numbers and types.

The neck 20 is positioned under the head 10.

1) Description of Fan 100

The fan 100 provides a transfer force for the air introduced into the air cleaner through the intake fan (not shown) to go through a purification process and be discharged back to the outside of the air cleaner. In an embodiment, the fan 100 may include a plurality of blades to discharge air to the outside.

In the embodiment shown, these are rotatably positioned on the front side of the head 10 of the fan 100, but may be provided as any shape that is capable of discharging the air in the air cleaner to the outside, and may be provided at any position.

The rotation speed of the fan 100 may be controlled. The amount of power consumption by the air cleaner varies according to the rotation speed of the fan 100, and as the fan 100 is rotated at a higher speed, the noise generated increases, and accordingly, it is preferable to perform air purification with the fan 100 maintained at a low rotation speed as possible.

In an embodiment, the rotation speed of the fan 100 may be divided into three levels, and the rotation speed may be set in an ascending order from the first level to the third level, although it is obvious that the method may be changed.

The air cleaner according to an embodiment of the present invention may perform air purification by rotating the fan 100 at a low speed as possible, while performing air purification by rotating it at a high speed only when necessary, which will be described below in detail.

(2) Description of Neck 20

The neck 20 is positioned under the head 10.

The neck 20 includes a neck housing (not shown), a head frame (not shown) positioned inside the head 10, a frame body (not shown) positioned inside the neck housing (not shown) and coupled to the head frame (not shown), and a vertical rotation member (not shown) that vertically rotates the head 10.

The body 30 is positioned under the neck 20.

(3) Description of Body 30

The body 30 is positioned under the neck 20.

The body 30 includes a body housing (not shown) that protects the inner components, a horizontal rotation member (not shown) that horizontally rotates the head 10 and the neck 20, an inner body (not shown) that is attached to the inner components, etc., and is secured to the base 40.

The body housing (not shown) has a hollow part (not shown) in the center where the neck housing (not shown) is inserted so as to be rotatable horizontally. In addition, there are provided a display (not shown) that displays an operating state and receives a signal from a user, and a plurality of motion sensors (not shown) that detect movements or the like of nearby users, which are positioned in front of the body housing (not shown).

The base 40 is positioned under the body 30.

(4) Description of Base 40

The base 40 forms a bottom surface of the air cleaner. The base 40 is provided with a plurality of wheels (not shown) for movement and a cable (not shown) for receiving power from the outside.

Alternatively, the base 40 may be fixed at one position to be used without a separate means for movement. In this case, as will be described below, the air cleaner according to an embodiment of the present invention is preferable in that it controls the rotation speed of the fan 100 by analyzing a user's life pattern at a specific location.

(5) Description of Sensor 200

The sensor 200 is positioned inside or outside the air cleaner, and senses various pieces of information for diagnosing quality of indoor air.

In an embodiment, the sensor 200 may measure the temperature and humidity in the indoor air, and the concentration of particles contained in the indoor air. For example, the sensor 200 may measure the concentration of dust, the concentration of fine dust, the concentration of indoor volatile organic compound, the concentration of indoor air oxygen, the concentration of indoor air carbon dioxide, etc. The particles described above are merely examples of particles, and the embodiments are not limited thereto and may include various types of particles.

In the air cleaner and the method for controlling the same according to an embodiment of the present invention, the concentration of fine dust will be mainly used, but the concentrations of various other particles described above may be used to control the operation of the air cleaner to be described below.

In this case, the sensor 200 is not limited to the air cleaner, but may be provided in a plurality of air purifying apparatuses to sense the concentrations of various particles.

(6) Description of Controller 300

Referring to FIG. 2, the air cleaner according to an embodiment of the present invention includes a controller 300 for controlling the operation of the air cleaner, and particularly, for controlling whether or not to rotate the fan 100 and the speed thereof. Several modules, which will be described below, may be included in the controller 300 to control the purifier in accordance with the information of the indoor air measured by the sensor 200. The controller 300 may be provided as any device such as a microprocessor, CPU, etc., which are capable of executing computations and generating control information.

The controller 300 includes a variation calculation module 310, a standard score calculation module 320, a learning module 330, an artificial intelligence control module 340, a pollution index calculation module 350, and an automatic control module 360.

In particular, the controller 300 is described as controlling the air cleaner according to the concentration of the fine dust and the variation in the concentration as described above, but the embodiment is not limited to the concentration of the fine dust, and the controller 300 may control the air purification based on the concentration of particles and the variation in the concentration measured by the sensor 200.

Further, as described above, the controller 300 may be provided in a plurality of air purifying apparatuses other than the air cleaner to perform the control operation.

For example, the controller 300 may be mounted on a hood provided in the kitchen, and by the operation of the variation calculation module 310, the information obtained by calculating the variation in the concentration of particles that may occur in the kitchen, the rotation speed of the fan 100 and the variation in the speed may be transmitted to the standard score calculation module 320.

The standard score calculation module 320 may respectively calculate, from the transmitted information, a standard score value for a preset time interval from a reference time and sum up the results by the present first method to be described below, and repeat the above process to calculate a plurality of summed standard score values.

The learning module 330 may store the above information corresponding to the highest value among the summed standard score values as an optimum value for the reference time.

The artificial intelligence control module 340 may control the rotation speed of the fan 100 in accordance with the rotation speed of the fan 100 that corresponds to the optimum value stored in the learning module 330 for every reference time.

As described above, the controller 300 may be mounted on the hood provided in the kitchen to perform operations. In this case, the hood provided in the kitchen described above is merely an example, and the embodiment is not limited thereto, and accordingly, any device capable of purifying air may be implemented.

1) Description of Variation Calculation Module 310

The variation calculation module 310 calculates the rotation speed of the fan 100, the variation in the rotation speed of the fan 100, the concentration of fine dust measured by the sensor 200, and the variation in the concentration of fine dust, for a preset time interval from the reference time.

In particular, the rotation speed of the fan 100 and the concentration of fine dust are calculated in real time, and the variation in the rotation speed of the fan 100 and the variation in the concentration of fine dust are calculated for the preset time interval.

The rotation speed of the fan 100, the variation in the rotation speed of the fan 100, and the variation in the concentration of fine dust calculated as described above are transmitted to the standard score calculation module 320 to be described below.

2) Description of Standard Score Calculation Module 320

By using the preset first method, the standard score calculation module 320 calculates any one or more of the rotation speed of the fan 100, the variation in the rotation speed of the fan 100, the concentration of fine dust, and the variation in the concentration of fine dust calculated as described above as the standard score values for the preset time interval from the reference time and sums up the standard score values.

It is to be noted that, for more accurate calculation of standard score values, the factors calculated by the standard score calculation module 320 as the standard score values for the preset time interval from the reference time preferably include all of the rotation speed of the fan 100, the variation in the rotation speed of the fan 100, the concentration of fine dust, and the variation in the concentration of fine dust.

In particular, the preset first method provides a high score to a low concentration of fine dust, a negative degree of variation in the concentration of fine dust, a low-speed rotation of the fan 100, and a low variation in the rotation speed of the fan 100.

For example, the preset first method may calculate a standard score based on the following table.

TABLE 1

| Rotation speed of the fan 100 | | Variation in rotation speed of the fan 100 | | Variation in concentration of fine dust | |
|---|---|---|---|---|---|
| Low | 15 | Low | 15 | Decrease | 15 |
| Middle | 10 | Middle | 10 | No Change | 10 |
| High | 5 | High | 5 | Increase | 5 |

For the concentration of fine dust, the lower concentration will be given a higher score, and this will not be described below in detail.

It is also noted that the table above is for illustrative purposes only, and the classification criteria and corresponding scores may be changed.

In addition, the process of summing up the standard score values for the preset time interval from the reference time calculated according to the table above can be understood by the example of the following table.

TABLE 2

| Rotation speed of the fan 100 | | Variation in rotation speed of the fan 100 | | Variation in concentration of fine dust | | Summed standard score values |
|---|---|---|---|---|---|---|
| Middle | 10 | High | 5 | Decrease | 15 | 30 |

Therefore, as described above, since the reference time and the preset time interval can be set successively, the result of the operation of the air purifying apparatus for the entire 24 hours a day may be calculated as the numerical value of standard score value based on the reference time and the preset time interval.

The standard score value calculated by the standard score calculation module 320 is stored such that the corresponding data, that is, the rotation speed of the fan 100, the variation in the rotation speed of the fan 100, the concentration of fine dust and the variation in the concentration of fine dust respectively are mapped with the preset time interval from the calculated reference time.

Therefore, as a result of the calculation at the standard score calculation module 320, the resultant value in the case of operating when the fan 100 is rotated at a specific speed, such as a quality of indoor air by the operation of the air purifying apparatus, an amount of power consumption in the operation of the air purifying apparatus, and so on, is converted into the numerical value and stored by time period.

3) Description of Learning Module 330

The learning module 330 compares the standard score values by time period, which are calculated by the standard score calculation module 320, and stores the rotation speed of the fan 100, the variation in the rotation speed of the fan 100, and the variation in the concentration of fine dust having the highest standard score value at the reference time as the optimum value at the reference time. At this time, as described above, the score values calculated based on the concentration of fine dust can also be summed.

More specifically, when the three conditions described above are satisfied (i.e., when the rotation speed of the fan 100 is low, the variation in the rotation speed of the fan 100 is small, and when the concentration of fine dust is low), it can be determined that it is possible to purify indoor air and minimize power consumption.

In particular, when the concentration of fine dust increases, it may be difficult to simultaneously achieve both the lowest rotation speed of the fan 100 and variation thereof and the lowest concentration of fine dust. Therefore, it is necessary to find a balance between the purification of indoor air and reduction of the power consumption.

To this end, the learning module 330 compares the order relation of the standard score values by time period, which are summed by the standard score calculation module 320, and stores the condition having the highest standard score value as the optimum value for the corresponding time period.

This is because, as described above, the reference time can be set for all 24 hours a day by repeating for a preset time interval.

The method of the learning module 330 for calculating the optimum value can be understood by the following table, which is an example of calculating the standard score values of the reference time.

TABLE 3

| No. | Rotation speed of the fan 100 | | Variation in rotation speed of the fan 100 | | Variation in concentration of fine dust | | Summed standard score values |
|---|---|---|---|---|---|---|---|
| 1 | Low | 15 | High | 5 | Increase | 5 | 25 |
| 2 | High | 5 | Middle | 10 | No Change | 10 | 25 |
| 3 | Middle | 10 | Low | 15 | No Change | 10 | 35 |

In the table above, since the summed standard score value is the highest at No. 3, the optimum value of the reference time corresponds to when the rotation speed of the fan 100 is Middle, the variation in the rotation speed of the fan 100 is Low, and when the variation in the concentration of fine dust is No Change. That is, at No. 3, the rotation speed of the fan 100 and the variation in the concentration of fine dust are not the highest standard score values, but since summing up the standard score values of each item results in the highest standard score value, controlling the air purifying apparatus in accordance with No. 3 can maximize the balance between indoor air purification and power consumption reduction.

As will be described below, the process of operation at each of the variation calculation module 310, the standard score calculation module 320, and the learning module 330 described above is repeated while the air purifying apparatus is operated, so as to calculate the rotation speed of the fan 100, the variation in the rotation speed of the fan 100, the concentration of fine dust, and the variation in the concentration of fine dust at the reference time, thereby accumulating and storing data for finding an optimal manner of operation.

A detailed description of the method for controlling the air purifying apparatus through the above will be described below.

The optimum value of the reference time stored by the learning module 330 is transmitted to the artificial intelligence control module 340.

4) Description of Artificial Intelligence Control Module 340

The artificial intelligence control module 340 controls the rotation speed of the fan 100 according to the rotation speed of the fan 100, the variation in the rotation speed of the fan 100, the concentration of fine dust, and the variation in the concentration of fine dust stored as the optimum values in the learning module 330.

In the example described above, the optimum values were achieved when the rotation speed of the fan 100 is Middle, the variation in the rotation speed of the fan 100 is Low, and when the variation in the concentration of fine dust is No Change, and accordingly, at every reference time (that is, when the real time corresponds to the reference time), the artificial intelligence control module 340 controls the rotation speed of the fan 100 so that the rotation speed of the fan 100 is Middle and the variation in the rotation speed of the fan 100 is Low in accordance with the optimum values stored in the learning module 330.

Since the data is repeatedly accumulated and stored in the variation calculation module 310, the standard score calculation module 320, and the learning module 330 described above, the artificial intelligence control module 340 may control the rotation speed of the fan 100 so that the air purifying apparatus may preemptively perform air purification optimized for each time period in accordance with the user's life pattern.

5) Description of Pollution Index Calculation Module 350

The pollution index calculation module 350 calculates the concentration of fine dust measured by the sensor 200 as a pollution index by using a preset second method.

In general, fine dust is divided into PM2.5 (extra fine dust) and PM10 (fine dust), and efficient indoor air purification is possible by differently adjusting the rotation speed of the fan 100 according to each concentration.

However, when there are different concentrations of PM2.5 and PM10, it is challenging to determine whether to put a weight on PM2.5 or PM10 when controlling the rotation speed of the fan 100.

Accordingly, by using the preset second method, the pollution index calculation module 350 calculates the pollution index as an index that can reflect the two concentrations of PM2.5 and PM10 for the concentration of fine dust measured by the sensor 200. As for the preset second method, any method that is capable of reflecting the measured concentration of fine dust may be used.

The preset second method for calculating the pollution index according to an embodiment will be described below. According to the preset second method to be described below, first, the PM10 index and the PM2.5 index are calculated respectively, and the pollution index is calculated using the calculated PM10 and PM2.5 indexes.

First, an example of a method for calculating the PM10 index will be described as follows.

TABLE 4

| PM10 Concentration range ($\mu g/m^3$) | Less than 30 | 30 or more, less than 80 | 80 or more, less than 150 | 150 or more, less than 500 | 500 or more |
|---|---|---|---|---|---|
| PM10 index | 25/30 * (PM 10 concentration) | 25/50 * ((PM 10 concentration) − 30) + 25 | 25/70 * ((PM 10 concentration) − 80) + 50 | 25/350 * ((PM 10 concentration) − 150) + 75 | 100 |
| Grade | Good | Normal | Bad | Very Bad | |

Next, an example of a method for calculating the PM2.5 index will be described as follows.

TABLE 5

| PM2.5 Concentration range (μg/m3) | Less than 15 | 15 or more, less than 40 | 40 or more, less than 80 | 80 or more, less than 300 | 300 or more |
|---|---|---|---|---|---|
| PM2.5 index | 25/15 * (PM 2.5 concentration) | 25/25 * ((PM 2.5 concentration) − 15) + 25 | 25/40 * ((PM 2.5 concentration) − 40) + 50 | 25/220 * ((PM 2.5 concentration) − 80) + 75 | 100 |
| Grade | Good | Normal | Bad | Very Bad | |

A method for calculating a pollution index using the PM10 index and PM2.5 index calculated through the methods described above, grades according to the calculated pollution index, and desired rotation speed of the fan 100 corresponding thereto are as follows. Pollution index= (0.5*PM10 index)+(0.5*PM2.5 index)

TABLE 6

| | 25 or more, less than 50 | 50 or more, Less than 75 |
|---|---|---|
| | Normal | Bad |
| 1$^{st}$ level | 2$^{nd}$ Level | 3$^{rd}$ Level |

The process of measuring the concentration of fine dust and calculating the pollution index described above may be performed in real time. The calculated pollution index is transmitted to the automatic control module 360.

6) Description of Automatic Control Module 360

The automatic control module 360 divides the pollution index calculated by the pollution index calculation module 350 into predetermined levels according to the order relation thereof, and controls the rotation speed of the fan 100 in accordance with the predetermined levels.

For example, when the pollution index is calculated as 40 in the pollution index calculation result table described above, the air grade corresponds to "Normal", and the rotation speed of the fan 100 suitable for this is "2$^{nd}$ Level".

In an embodiment, the automatic control module 360 divides the calculated pollution index into four levels of "Good", "Normal", "Bad", and "Very Bad", and accordingly controls so that the fan 100 is rotated in accordance with the determined rotation speed of the fan 100.

In an embodiment, the automatic control module 360 may control the rotation speed of the fan 100 according to the first level when the divided pollution index is "Good"; control the rotation speed of the fan 100 according to the second level when the divided pollution index is "Normal" or "Bad"; and may control the rotation speed of the fan 100 according to the third level when the divided pollution index is "Very Bad".

It is obvious that the number of levels for dividing the pollution index and the levels of the rotation speed of the fan 100 may be changed accordingly.

The operation of the automatic control module 360 described above may be performed in real time. That is, by the real-time operation of the pollution index calculation module 350 and the automatic control module 360, the air purifying apparatus may change the rotation speed of the fan 100 immediately in response to pollution of the indoor air.

2. Description of Method for Controlling Air Purifying Apparatus

The air purifying apparatus according to the present invention may perform various modes by the operations of the various modules 310, 320, 330, 340, 350, and 360 of the controller 300.

Hereinafter, the method for controlling the air purifying apparatus according to an exemplary embodiment of the present invention will be described in detail with reference to FIGS. 3 to 6. In FIGS. 3 to 6, fine dust will be described as an example of the particles.

(1) Description of Data Collection Mode (S100)

The data collection mode (S100) is a mode for collecting data required for the air purifying apparatus according to an embodiment of the present invention to operate in an artificial intelligence mode to be described below.

Unlike the artificial intelligence mode (S200) or automatic mode (S300) to be described below, the data collection mode (S100) is not individually performed, but is continuously repeated while the air purifying apparatus is operated, and collects data on the rotation speed of the fan 100, the variation in the rotation speed of the fan 100, the concentration of fine dust, the variation in the concentration of fine dust, etc. over time according to the user's life pattern.

That is, the data collection mode (S100) may be performed simultaneously with the artificial intelligence mode (S200) or the automatic mode (S300) to be described below.

Figure 4:
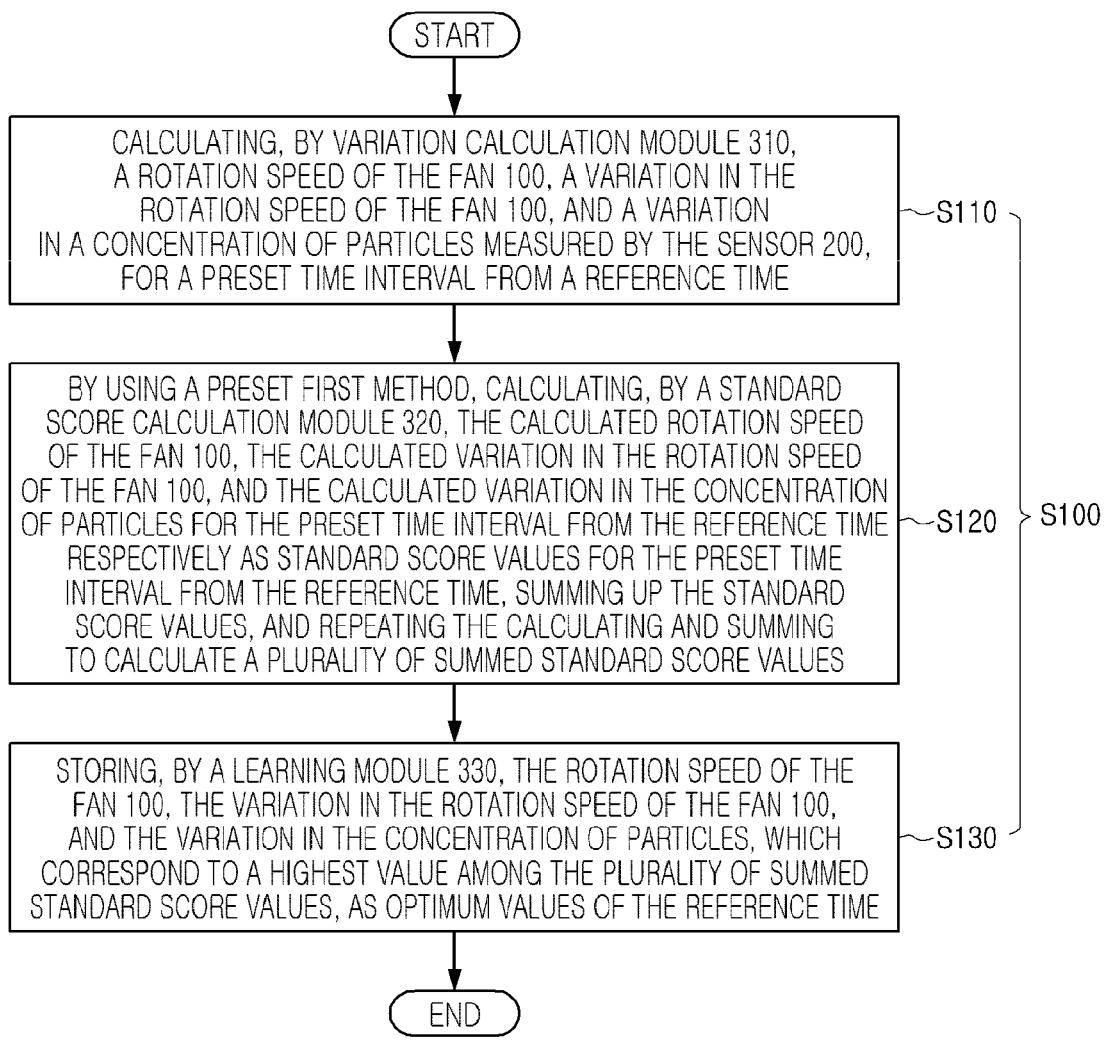
FIG. 4 is a flowchart showing the data collection mode in the control method of FIG. 3.

Referring to FIG. 4, first, the variation calculation module 310 calculates the rotation speed of the fan 100, the variation in the rotation speed of the fan 100, the concentration of fine dust, and the variation in the concentration of fine dust measured by the sensor 200 for the preset time interval from a reference time (S110).

By using the preset first method, the standard score calculation module 320 calculates the calculated rotation speed of the fan 100, the calculated variation in the rotation speed of the fan 100, and the calculated concentration of fine dust and variation in the concentration of fine dust for the preset time interval from the reference time respectively as the standard score values for the preset time interval from the reference time and sums up the standard score values, repeats this to calculate and sum a plurality of summed standard score values, and repeats this to calculate a plurality of summed standard score values (S120).

The learning module 330 stores the rotation speed of the fan 100, the variation in the rotation speed of the fan 100, the concentration of fine dust, and the variation in the concentration of fine dust corresponding to the highest value among the plurality of summed standard score values, as the optimum value for the reference time (S130). Of course, regarding the concentration of fine dust, it will be stored as the optimum value of the reference time when the value is the lowest.

In this case, as described above, it is preferable to store the data including all of the rotation speed of the fan 100, the variation in the rotation speed of the fan 100, the concentration of fine dust, and the variation in the concentration of fine dust as the optimum value of the preset time interval from the reference time, in order to improve the reliability of the data.

In addition, as described above, there may be a plurality of reference times. That is, while the air purifying apparatus is operated in the data collection mode (S100), data may be successively accumulated and stored such that the user's life pattern for the entire 24 hours a day and the corresponding rotation speed of the fan 100, variation in the rotation speed of the fan 100, concentration of fine dust, variation in the concentration of fine dust, etc. may be collected.

That is, the operation step described above is continuously repeated while the air purifying apparatus is operated, thereby continuously collecting the data for more accurately forecasting the user's life pattern.

(2) Description of Artificial Intelligence Mode (S200)

The artificial intelligence mode (S200) is a mode for controlling the air purifying apparatus in accordance with the data relevant to the user's life pattern collected in the data collection mode (S100).

In addition, since it is essential to collect the data relevant to the user's life pattern to operate the artificial intelligence mode (S200), it is preferable that the data collection mode (S100) described above be performed in advance.

The artificial intelligence mode (S200) may be selectively operated with the automatic mode (S300) to be described below. That is, the air purifying apparatus is operated according to one of the artificial intelligence mode (S200) and the automatic mode (S300), while the mode is freely switched between the artificial intelligence mode (S200) and the automatic mode (S300).

In an embodiment, the user may directly select the artificial intelligence mode (S200) or the automatic mode (S300). In this case, the mode in operation is terminated and the operation of the selected mode is started.

In a method for controlling the air purifying apparatus according to an embodiment of the present invention, the air purifying apparatus operating in a certain mode may be allowed to be, or blocked from being switched to another mode according to the concentration of fine dust measured in real time, which will be described below in detail.

Figure 5:
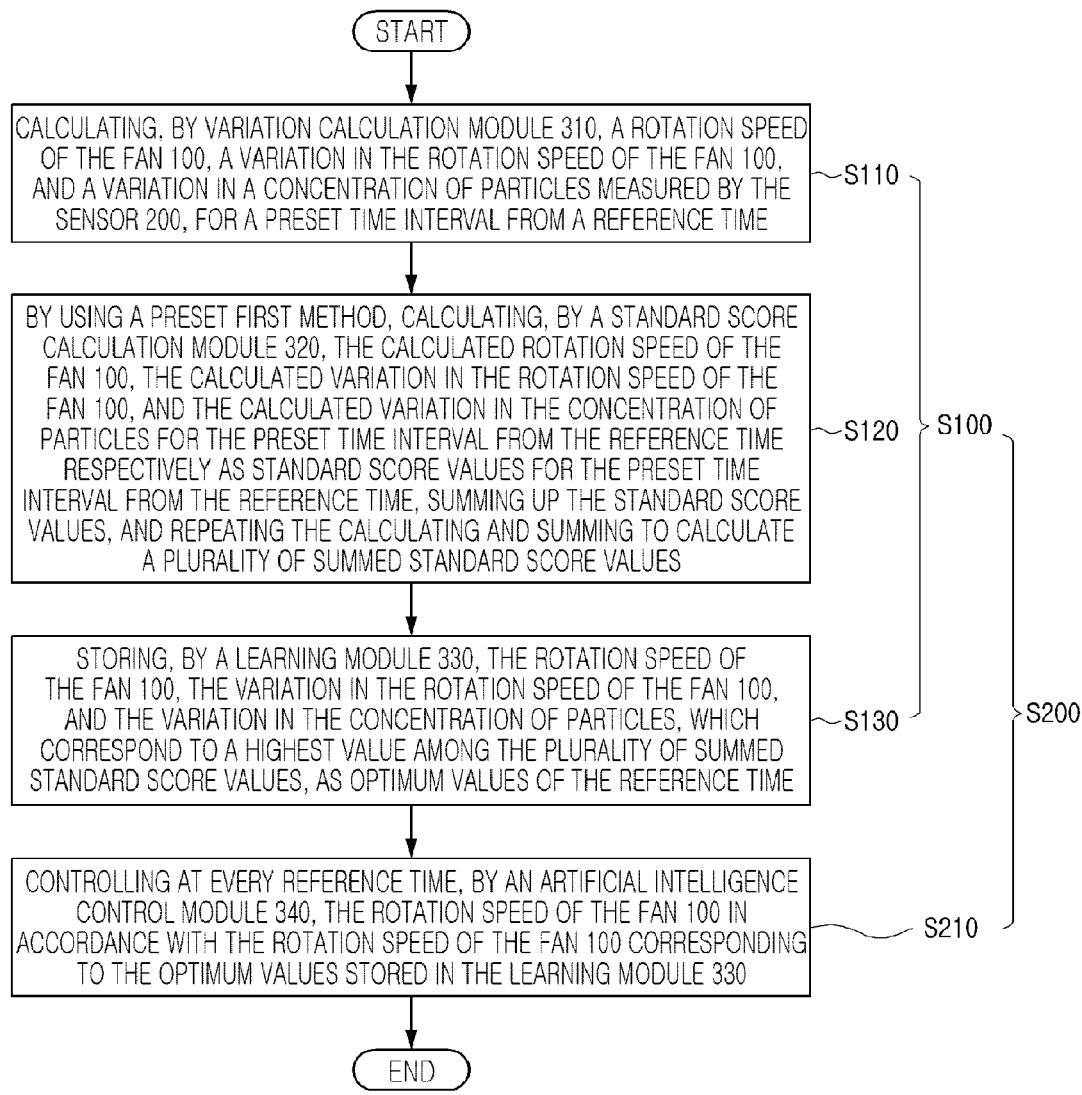
FIG. 5 is a flowchart showing the artificial intelligence mode of the control method of FIG. 3.

Referring to FIG. 5, first, the data collection mode (S100) described above is performed to collect the data relevant to the user's life pattern according to the reference time (S110 to S130).

When the actual time corresponds to the reference time, the artificial intelligence control module 340 controls at every reference time the rotation speed of the fan 100 in accordance with the rotation speed of the fan 100 corresponding to the optimum value stored in the learning module 330 (S210).

That is, based on the data collected in the data collection mode (S100), the user's life pattern is analyzed by time period, and accordingly, when the actual time is the same as the reference time, that is, the time at which the optimum value is stored, the fan 100 is controlled to be rotated in accordance with the rotation speed of the fan 100 corresponding to the optimum value.

Accordingly, without requiring a separate input by the user, the presence of fine dust and concentration thereof are forecasted based on the user's life pattern, and the rotation speed of the fan 100 can be preemptively controlled, thereby increasing the efficiency of indoor air purification and also reducing power consumption.

(3) Description of Automatic Mode (S300)

The automatic mode (S300) is a mode for controlling the air purifying apparatus in accordance with the concentration of fine dust measured in real time by the sensor 200.

Figure 6:
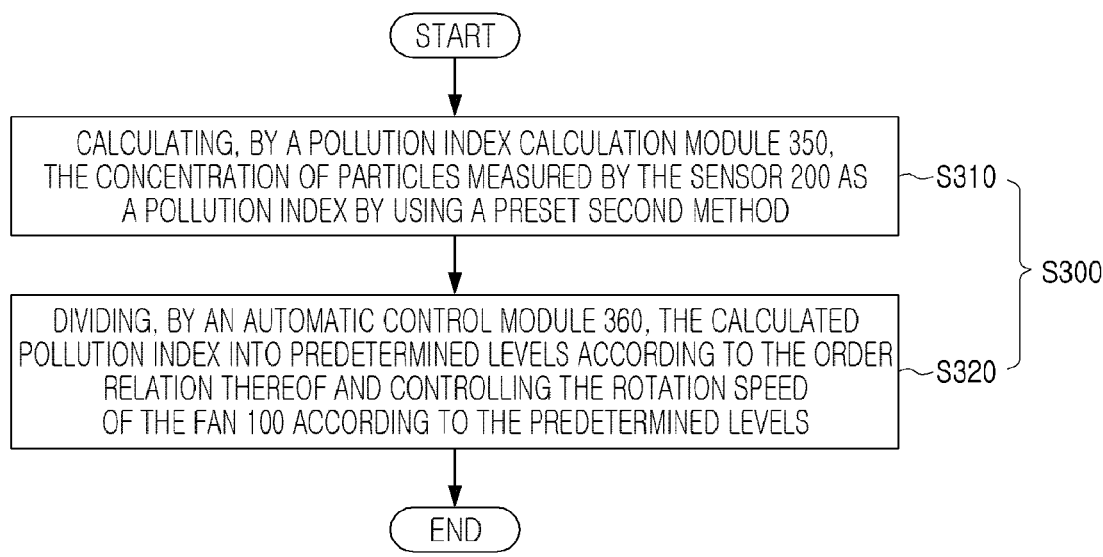
FIG. 6 is a flowchart showing the automatic mode in the control method of FIG. 3.

Referring to FIG. 6, the pollution index calculation module 350 calculates the concentration of fine dust measured in real time by the sensor 200 as the pollution index by using the preset second method (S310).

The preset second method may be any method which is capable of calculating the degree of pollution of indoor air using the measured concentration of fine dust, and the method for calculating the pollution index using the preset second method according to an embodiment of the present invention is already described above.

The automatic control module 360 divides the calculated pollution index into predetermined levels according to the order relation thereof, and controls the rotation speed of the fan 100 according to the predetermined level (S320).

As described above, the pollution index calculated in an embodiment of the present invention may be divided into the four levels, and accordingly, the speed of the fan 100 may be controlled in the three levels.

In the automatic mode (S300), since the control of the air purifying apparatus is performed in real time according to the degree of pollution of the indoor air, it is possible that the indoor air be immediately purified in real time.

3. Description of Mode Switching Process Between Artificial Intelligence Mode and Automatic Mode As described above, the difference between the artificial intelligence mode and the automatic mode is that the artificial intelligence mode preemptively performs air purification in accordance with the user's life pattern for each period of time, while the automatic mode performs air purification in accordance with the indoor air condition in real time.

Since the user's life pattern is generally constant on a daily and weekly basis, it would be generally desirable to preemptively perform air purification according to the artificial intelligence mode in order to improve the efficiency of indoor air purification and reduce power consumption.

Meanwhile, if the artificial intelligence mode is maintained unconditionally even when the concentration of particles of indoor air rapidly rises due to unforeseen reasons, it may be difficult to achieve the original purpose of the air purifying apparatus of purifying indoor air or to reduce power consumption.

Therefore, when the indoor air condition rapidly deteriorates while the air purifying apparatus is operated in the artificial intelligence mode or the automatic mode, regardless of the mode in use, the method for controlling the air purifying apparatus according to an embodiment of the present invention performs operation in the automatic mode to control the rotation speed of the fan 100 in accordance with the concentration of particles in real time.

Hereinafter, the process of switching a mode of the air purifying apparatus, which is operated in each mode according to the indoor air condition, will be described in detail as an example with reference to FIGS. 7 to 10.

In FIGS. 7 to 10, fine dust will be described as an example of the particles.

The horizontal line shown in FIGS. 7 to 10 denotes a time axis, and vertical lines dividing the horizontal lines at regular intervals denote the time interval.

In the embodiment shown, one section dividing the horizontal line refers to a cycle for measuring the concentration of fine dust by the sensor 200, and the embodiment will be described below by assuming that the five sections correspond to the preset time interval. In an embodiment, one section may mean one minute.

The sensor 200 measures the concentration of fine dust in the indoor air in real time in each section.

In addition, the mode switching process between the artificial intelligence mode and the automatic mode described below may be continuously performed while the air purifying apparatus is operated.

Figure 7:
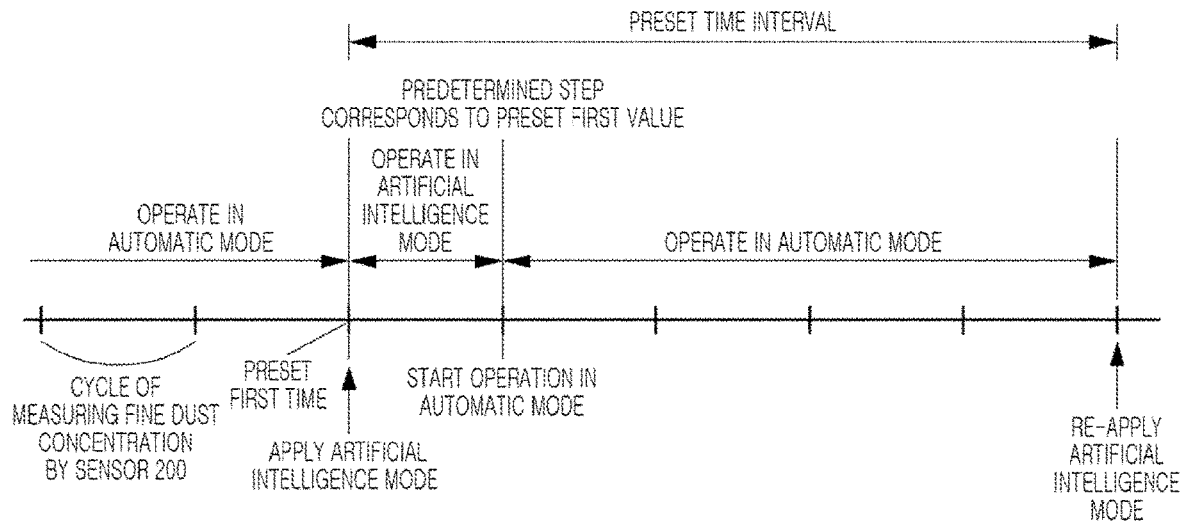
FIGS. 7 and 8 are diagrams showing the method of the air purifying apparatus according to an embodiment of the present invention, which is operated according to air quality when the artificial intelligence mode is applied while operating in the automatic mode.

(1) Description of Method for Controlling when Applying Artificial Intelligence Mode During Operation in Automatic Mode 1) Description of Case when Air Quality is Very Bad Referring to FIG. 7, the air purifying apparatus is operated in the automatic mode. As described above, it is advantageous to operate in the artificial intelligence mode in order to increase the efficiency of indoor air purification and to reduce power consumption.

Therefore, in order to switch to the artificial intelligence mode, when the actual time corresponds to the reference time, the artificial intelligence mode is applied to the air purifying apparatus. This process may be performed without requiring a separate input process by a user.

After the artificial intelligence mode is applied, the air purifying apparatus is operated in the artificial intelligence mode for the time corresponding to one section. This is based on the assumption that the concentration of fine dust measured by the sensor 200 at the reference time is not high.

After the artificial intelligence mode is applied, the time interval at which the sensor 200 measures the concentration of fine dust, that is, the length and number of sections may be changed.

In particular, after time corresponding to one section elapses, when the pollution index calculated using the preset second method from the concentration of fine dust measured by the sensor 200 corresponds to the preset level, that is, "Very Bad" among the predetermined levels, the artificial intelligence mode is terminated and it is switched to the automatic mode without a separate input process by the user.

As described above, since the automatic mode determines the rotation speed of the fan 100 in real time in accordance with the concentration of fine dust in the indoor air, the rotation speed of the fan 100 will be determined to be "High".

When the artificial intelligence mode is applied and the preset time interval (5 sections in FIG. 7) elapses, the artificial intelligence mode is again applied to the air purifying apparatus.

In particular, when the concentration of fine dust measured by the sensor 200 is not high, the air purifying apparatus is operated in the artificial intelligence mode, but it will be maintained in the automatic mode through the process described above when the concentration of fine dust measured by the sensor 200 is high.

2) Description of Case when Air Quality is not Very Bad

Figure 8:
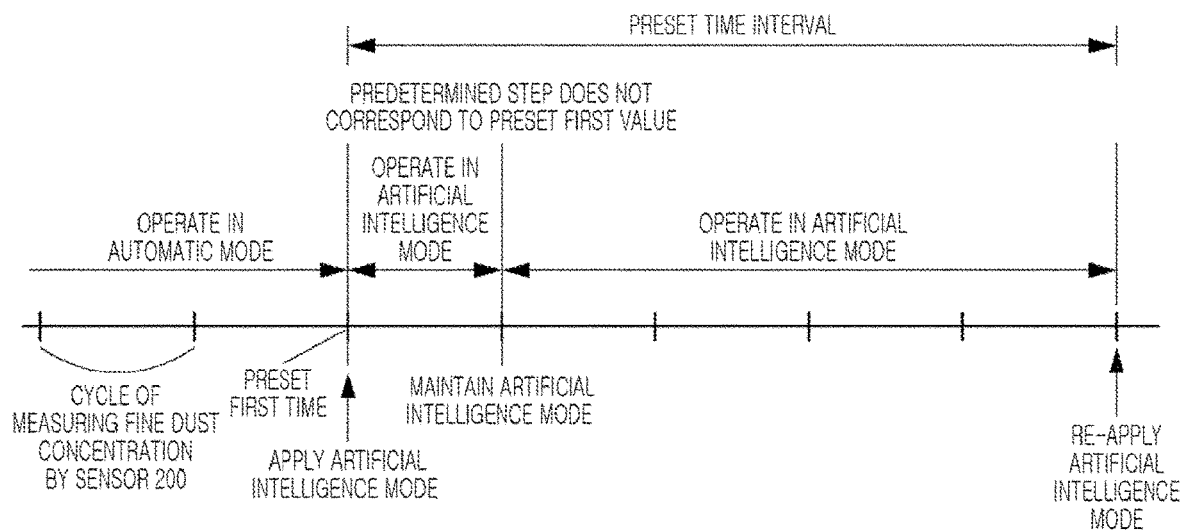

Referring to FIG. 8, the air purifying apparatus is operated in the automatic mode. As described above, it is advantageous to operate in the artificial intelligence mode in order to increase the efficiency of indoor air purification and to reduce power consumption.

In order to switch to the artificial intelligence mode, the artificial intelligence mode is applied to the air purifying apparatus when the actual time corresponds to the reference time, without requiring a separate input process by the user.

After the artificial intelligence mode is applied, the air purifying apparatus is operated in the artificial intelligence mode for the time corresponding to one section. This is based on the assumption that the concentration of fine dust measured by the sensor 200 at the reference time is not high.

After the artificial intelligence mode is applied, the time interval at which the sensor 200 measures the concentration of fine dust, that is, the length and number of sections may be changed.

After time corresponding to one section elapses, the sensor 200 again measures the concentration of fine dust in the indoor air in real time.

The example shown in FIG. 8 is in a situation when the pollution index calculated using the preset second method from the concentration of fine dust measured by the sensor 200 does not correspond to the preset level, that is, "Very Bad" among the predetermined levels, and in this situation, it is unnecessary to switch to the automatic mode.

Accordingly, rather than switching to the automatic mode, the air purifying apparatus maintains the artificial intelligence mode, and the artificial intelligence mode is re-applied after preset time interval, that is, after time corresponding to 5 sections elapses.

At this time, when the concentration of fine dust measured by the sensor 200 is not high, the air purifying apparatus is maintained in the artificial intelligence mode, but it will be switched to the automatic mode through the process described above when the concentration of fine dust measured by the sensor 200 is high.

Therefore, while the air purifying apparatus operating in the automatic mode may be switched to the artificial intelligence mode without requiring a separate input process, when there is a very high concentration of fine dust in the indoor air, the air purifying apparatus may operate in the automatic mode and operate the fan 100 at a high rotation speed despite the application of the artificial intelligence mode, and as a result, immediate indoor air purification is enabled.

In addition, after switching to the automatic mode, since the artificial intelligence mode is applied again after the preset time interval, it is possible to increase the efficiency of indoor air purification and to reduce power consumption.

Figure 9:
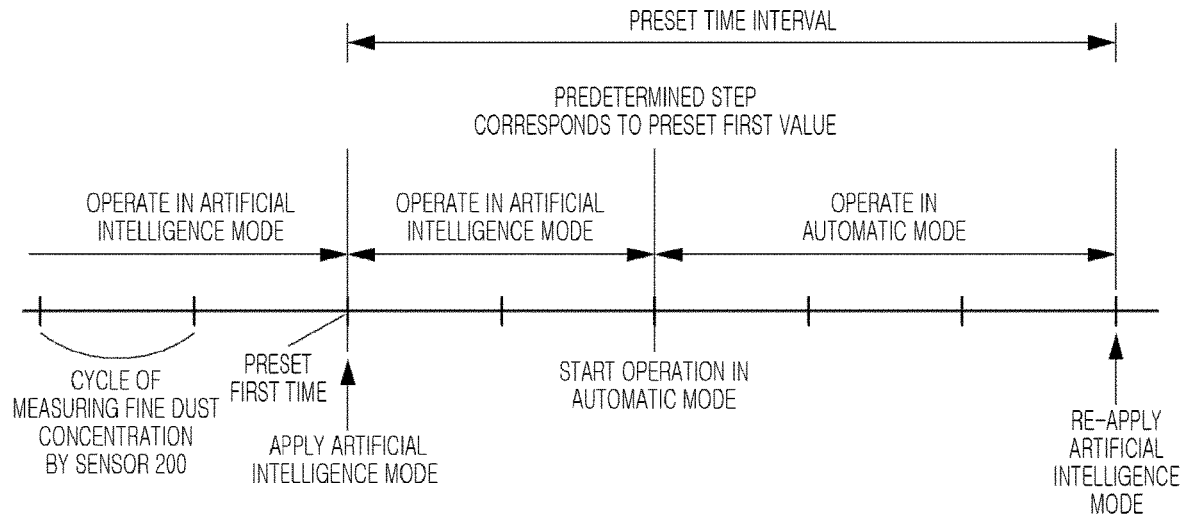
FIGS. 9 and 10 are diagrams showing the method of the air purifying apparatus according to an embodiment of the present invention, which is operated according to air quality when the artificial intelligence mode is applied while operating in the artificial intelligence mode.

(2) Description of Control Method During Operation in Artificial Intelligence Mode 1) Description of Case when Air Quality is Very Bad Referring to FIG. 9, the air purifying apparatus is operated in the artificial intelligence mode. As described above, it is advantageous to operate in the artificial intelligence mode in order to increase the efficiency of indoor air purification and to reduce power consumption.

When the actual time corresponds to the reference time, the artificial intelligence mode is applied. In this case, it will be understood that this application of the artificial intelligence mode is not for mode switching, but for determining whether or not to maintain the artificial intelligence mode.

After the artificial intelligence mode is applied, the air purifying apparatus is operated in the artificial intelligence mode for the time corresponding to two sections. Since the sensor 200 measures the concentration of fine dust in the indoor air in real time for each section, the detection process would have been performed two times.

After the artificial intelligence mode is applied, the time interval at which the sensor 200 measures the concentration of fine dust, that is, the length and number of sections may be changed.

In the example shown, the concentration of fine dust in the indoor air was not high upon elapse of time corresponding to one section, but then upon elapse of time corresponding to two sections, the pollution index calculated using the preset second method from the concentration of fine dust measured by the sensor 200 corresponds to the preset level, that is, "Very Bad" among the predetermined levels.

In this case, the artificial intelligence mode is terminated and the operation is switched to the automatic mode without requiring a separate input process by the user, and the air purifying apparatus is operated in the automatic mode for the remaining time (i.e., for the time corresponding to the three remaining sections in the preset time interval).

As described above, since the automatic mode determines the rotation speed of the fan 100 in real time in accordance with the concentration of fine dust in the indoor air, the rotation speed of the fan 100 will be determined to be "High".

When the preset time intervals elapse (i.e., when the time corresponding to give sections elapse), the artificial intelligence mode is re-applied to the air purifying apparatus.

In particular, when the concentration of fine dust measured by the sensor 200 is not high, the air purifying apparatus is operated in the artificial intelligence mode, but it will be maintained in the automatic mode through the process described above when the concentration of fine dust measured by the sensor 200 is high.

2) Description of Case when Air Quality is not Very Bad

Figure 10:
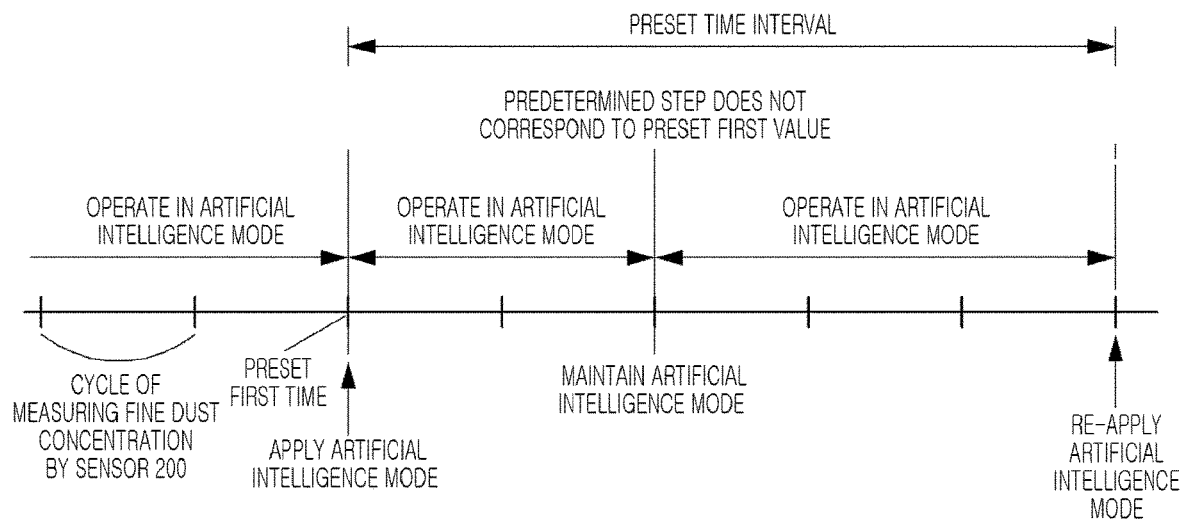

Referring to FIG. 10, the air purifying apparatus is operated in the artificial intelligence mode. As described above, it is advantageous to operate in the artificial intelligence mode in order to increase the efficiency of indoor air purification and to reduce power consumption.

When the actual time corresponds to the reference time, the artificial intelligence mode is applied. In this case, it will be understood that this application of the artificial intelligence mode is not for mode switching, but for determining whether or not to maintain the artificial intelligence mode.

After the artificial intelligence mode is applied, the air purifying apparatus is operated in the artificial intelligence mode for the time corresponding to the two sections. Since the sensor 200 measures the concentration of fine dust in the indoor air in real time for each section, the detection process would have been performed two times.

As described above, after the artificial intelligence mode is applied, the time interval at which the sensor 200 measures the concentration of fine dust, that is, the length and number of sections may be changed.

The example shown is a situation when the pollution index calculated using the preset second method from the concentration of fine dust measured by the sensor 200 does not correspond to the preset level, that is, "Very Bad" among the predetermined levels, and in this situation, it is unnecessary to switch to the automatic mode.

Accordingly, rather than switching to the automatic mode, the air purifying apparatus maintains the artificial intelligence mode, and the artificial intelligence mode is re-applied after preset time interval, that is, after time corresponding to the 5 sections elapses.

In particular, when the concentration of fine dust measured by the sensor 200 is not high, the air purifying apparatus is operated in the artificial intelligence mode, but it will be maintained in the automatic mode through the process described above when the concentration of fine dust measured by the sensor 200 is high.

Therefore, when the air purifying apparatus is operated in the artificial intelligence mode, the artificial intelligence mode is maintained because it is advantageous to increase the efficiency of indoor air purification and to reduce power consumption, but when the degree of pollution of the indoor air measured by the sensor 200 is higher than the reference value, by switching to the automatic mode regardless of the user input and operating the fan 100 at a high rotation speed, it is possible to immediately respond to the situation of the indoor air which is deteriorated in an instant.

In addition, after switching to the automatic mode, since the artificial intelligence mode is applied again after the preset time interval, it is possible to increase the efficiency of indoor air purification and to reduce power consumption.

(3) Description of Process of Operating in Automatic Mode Regardless of Actual Time The examples described above relate to the case of operating in the artificial intelligence mode or the automatic mode when the actual time corresponds to the reference time according to the user's life pattern determined based on the data collected by the data collection mode. In other words, the "time" acts as a variable for determining the operating mode of the air purifying apparatus.

However, when the amount of fine dust generated increases rapidly unlike usual life pattern, it is difficult to expect the air purifying apparatus to perform its original role of purifying indoor air if the operation mode of the air purifying apparatus is controlled with the time as the main variable regardless of the indoor air quality.

Therefore, in an embodiment of the present invention, when the pollution index calculated using the preset second method from the concentration of fine dust measured by the sensor 200 corresponds to the preset level, that is, "Very Bad" among predetermined levels, the air purifying apparatus is operated in the automatic mode regardless of whether or not the actual time corresponds to the reference time.

Alternatively, the air purifying apparatus may be operated such that the rotation speed of the fan 100 is maximized immediately without the process of switching to the automatic mode.

It is preferable that this process be performed without a separate input process by the user so that it can immediately react to the quality of indoor air. In this case, it is preferable that a separate display window (not shown) or the like is provided to inform the situation to the user who may be in doubt upon finding out that, despite the application of the artificial intelligence mode, the fan 100 is operated in the automatic mode or at a maximum speed, which is different from the rotation speed of the fan 100 according to the user's usual life pattern.

In other words, the air purifying apparatus is forcibly operated in the automatic mode regardless of the operation mode applied by the user.

Therefore, at normal times, the air purifying apparatus is operated in the artificial intelligence mode determined in accordance with the concentration of fine dust generated according to the user's life pattern, but when the concentration of fine dust increases rapidly, the rotation speed of the fan 100 is maximized regardless of whether or not the actual time corresponds to the reference time, so that indoor air can be quickly purified.

Although the above has been described with reference to a preferred embodiment of the present invention, those skilled in the art will appreciate that various modifications and changes can be made to the present invention without departing from the spirit and scope of the present invention described in the following claims.

DESCRIPTION OF REFERENCE NUMERALS

10: head
20: neck
30: body

40: base
100: fan
200: sensor
300: controller
310: variation calculation module
320: standard score calculation module
330: learning module
340: artificial intelligence control module
350: pollution index calculation module
360: automatic control module

The invention claimed is:

1. An air purifying apparatus comprising:
a fan for discharging air;
a sensor; and
a controller for controlling a rotation of the fan,
wherein the controller comprises:
   a variation calculation module for calculating a rotation speed of the fan, a variation in the rotation speed of the fan, and a variation in a concentration of particles measured by the sensor, for a preset time interval from a reference time;
   a standard score calculation module for calculating, by using a preset first method, the calculated rotation speed of the fan, the calculated variation in the rotation speed of the fan, and the calculated variation in the concentration of particles for the preset time interval from the reference time as standard score value for the preset time interval from the reference time, and repeating the calculating to calculate standard score values for each of the preset time intervals from a plurality of reference times;
   a learning module for storing, as optimum values for each reference time, the rotation speed of the fan, the variation in the rotation speed of the fan, and the variation in the concentration of particles, which correspond to a highest value among the standard score values for each plurality of reference times; and
   an artificial intelligence control module for controlling, at every reference time, the rotation speed of the fan in accordance with the rotation speed of the fan corresponding to the optimum values stored in the learning module.

2. The air purifying apparatus of claim 1, comprising a pollution index calculation module for calculating the concentration of particles measured by the sensor as a pollution index by using a preset second method.

3. The air purifying apparatus of claim 2, comprising an automatic control module for determining the calculated pollution index into one of predetermined levels according to the size of the calculated pollution index, and controlling the rotation speed of the fan to correspond to the determined levels.

4. A method for controlling an air purifying apparatus including a fan for discharging air and a sensor, the method comprising steps of:
   (a) calculating, by a variation calculation module, a rotation speed of the fan, a variation in the rotation speed of the fan, and a variation in a concentration of particles measured by the sensor, for a preset time interval from a reference time;
   (b) by using a preset first method, calculating, by a standard score calculation module, the calculated rotation speed of the fan, the calculated variation in the rotation speed of the fan, and the calculated variation in the concentration of particles for the preset time interval from the reference time as standard score values for the preset time interval from the reference time, and repeating the calculating to calculate standard score values for each of the preset time intervals from a plurality of reference times;
   (c) storing, by a learning module, the rotation speed of the fan, the variation in the rotation speed of the fan, and the variation in the concentration of particles, which correspond to a highest value among the standard score values for each plurality of reference times, as optimum values for each reference time; and
   (d) controlling at every reference time, by an artificial intelligence control module, the rotation speed of the fan in accordance with the rotation speed of the fan corresponding to the optimum values stored in the learning module.

5. The method of claim 4, wherein the air purifying apparatus is operable in a data collection mode, wherein the data collection mode is to repeat Steps (a) to (c).

6. The method of claim 5, wherein the data collection mode and Step (d) are simultaneously operable.

7. The method of claim 4, wherein the air purifying apparatus is operable in an artificial intelligence mode, wherein the artificial intelligence mode is to repeat Steps (a) to (d).

8. The method of claim 7, further comprising (e) calculating, by a pollution index calculation module, the concentration of particles measured by the sensor as a pollution index by using a preset second method.

9. The method of claim 8, further comprising,
after Step (e),
   (f) determining, by an automatic control module, the calculated pollution index into one of predetermined levels according to the size of the calculated pollution index, and controlling the rotation speed of the fan to correspond to the determined levels.

10. The method of claim 9, wherein the air purifying apparatus is operable in an automatic mode, wherein the automatic mode is to repeat Steps (e) and (f).

11. The method of claim 10, wherein, while the air purifying apparatus is operated in the artificial intelligence mode,
   when the pollution index obtained by calculating the concentration of particles measured by the sensor by using the preset second method corresponds to a preset level among the predetermined levels divided by the automatic control module,
   the air purifying apparatus is forcibly operated in the automatic mode.

12. The method of claim 10, wherein,
when an actual time corresponds to the reference time while the air purifying apparatus is operated in the automatic mode, and
when the pollution index obtained by calculating the concentration of particles measured by the sensor by using the preset second method corresponds to a preset level among the predetermined levels divided by the automatic control module,
the air purifying apparatus is operated in the automatic mode.

13. The method of claim 12, wherein,
when the actual time corresponds to the reference time while the air purifying apparatus is operated in the automatic mode, and
when the pollution index obtained by calculating the concentration of particles measured by the sensor by using the preset second method does not correspond to a preset level among the predetermined levels divided by the automatic control module, the air purifying apparatus is operated in the artificial intelligence mode.

14. The method of claim 10, wherein, when an actual time corresponds to the reference time while the air purifying apparatus is operated in the artificial intelligence mode, and when the pollution index obtained by calculating the concentration of particles measured by the sensor by using the preset second method corresponds to a preset level among the predetermined levels divided by the automatic control module, the air purifying apparatus is operated in the automatic mode.

15. The method of claim 14, wherein, when the actual time corresponds to the reference time while the air purifying apparatus is operated in the artificial intelligence mode, and when the pollution index obtained by calculating the concentration of particles measured by the sensor by using the preset second method does not correspond to a preset level among the predetermined levels divided by the automatic control module, the air purifying apparatus is operated in the artificial intelligence mode.

* * * * *